Dec. 18, 1928.                                               1,695,921
                        E. HARMES
                     MOLDING MACHINE
                   Filed April 9, 1927           5 Sheets-Sheet 2
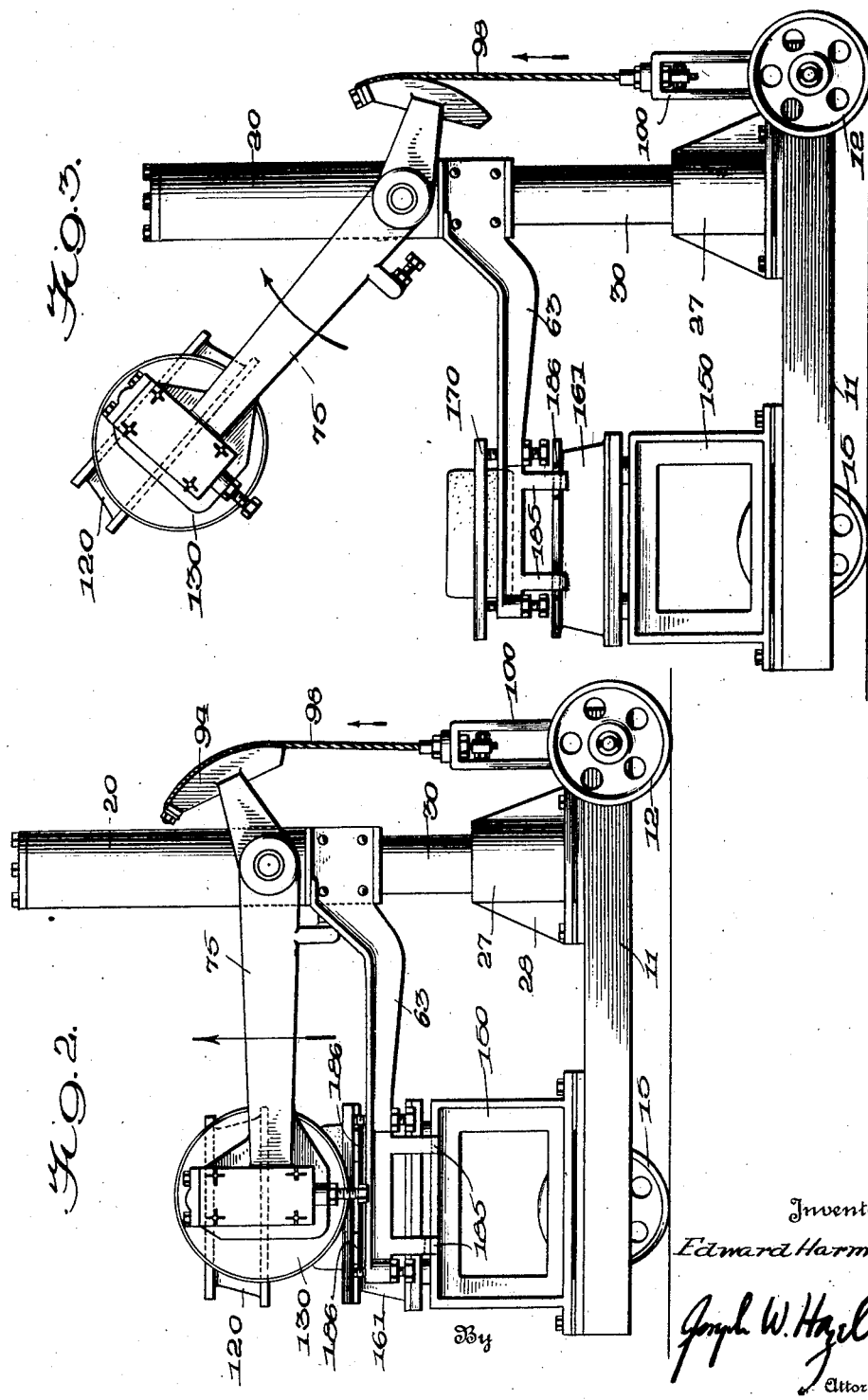
Inventor
Edward Harmes,
By Joseph W. Hazell
Attorney

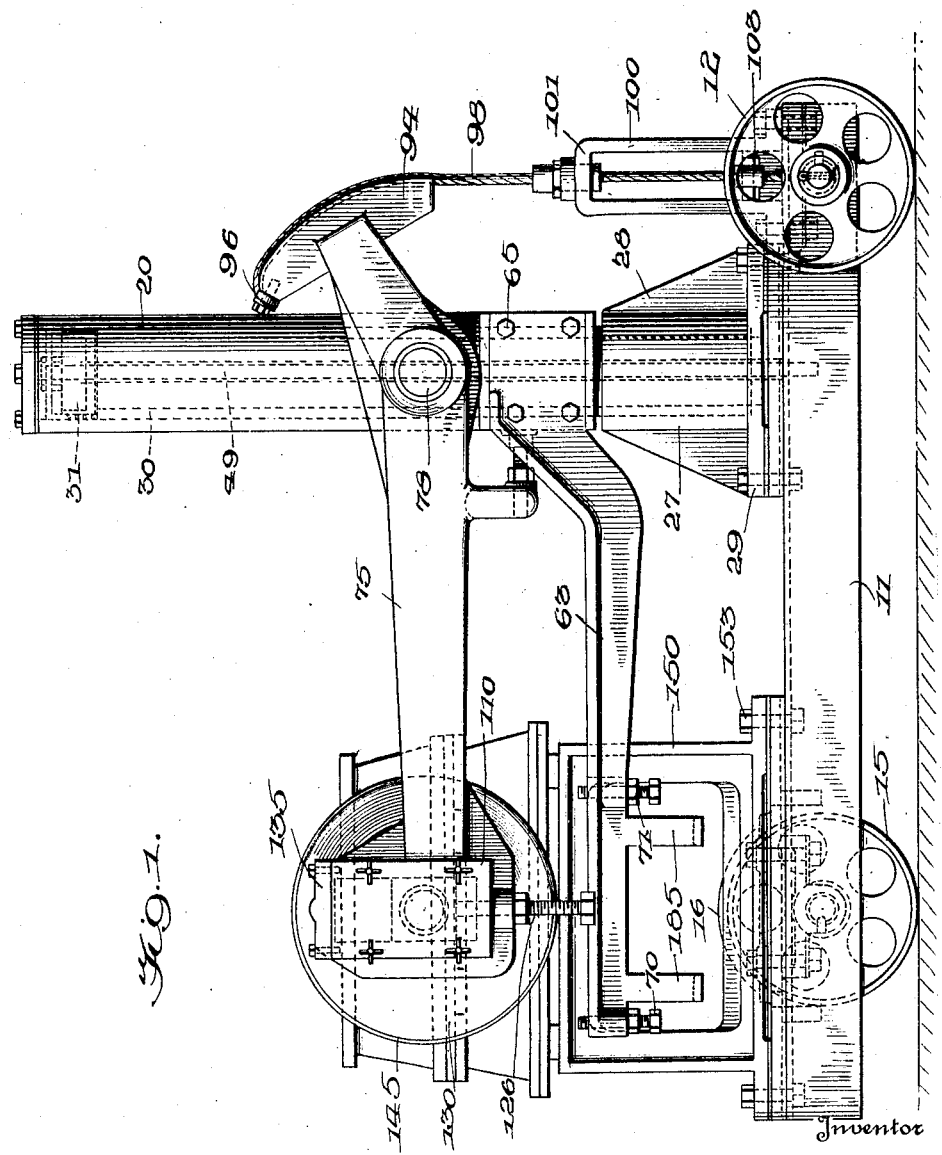

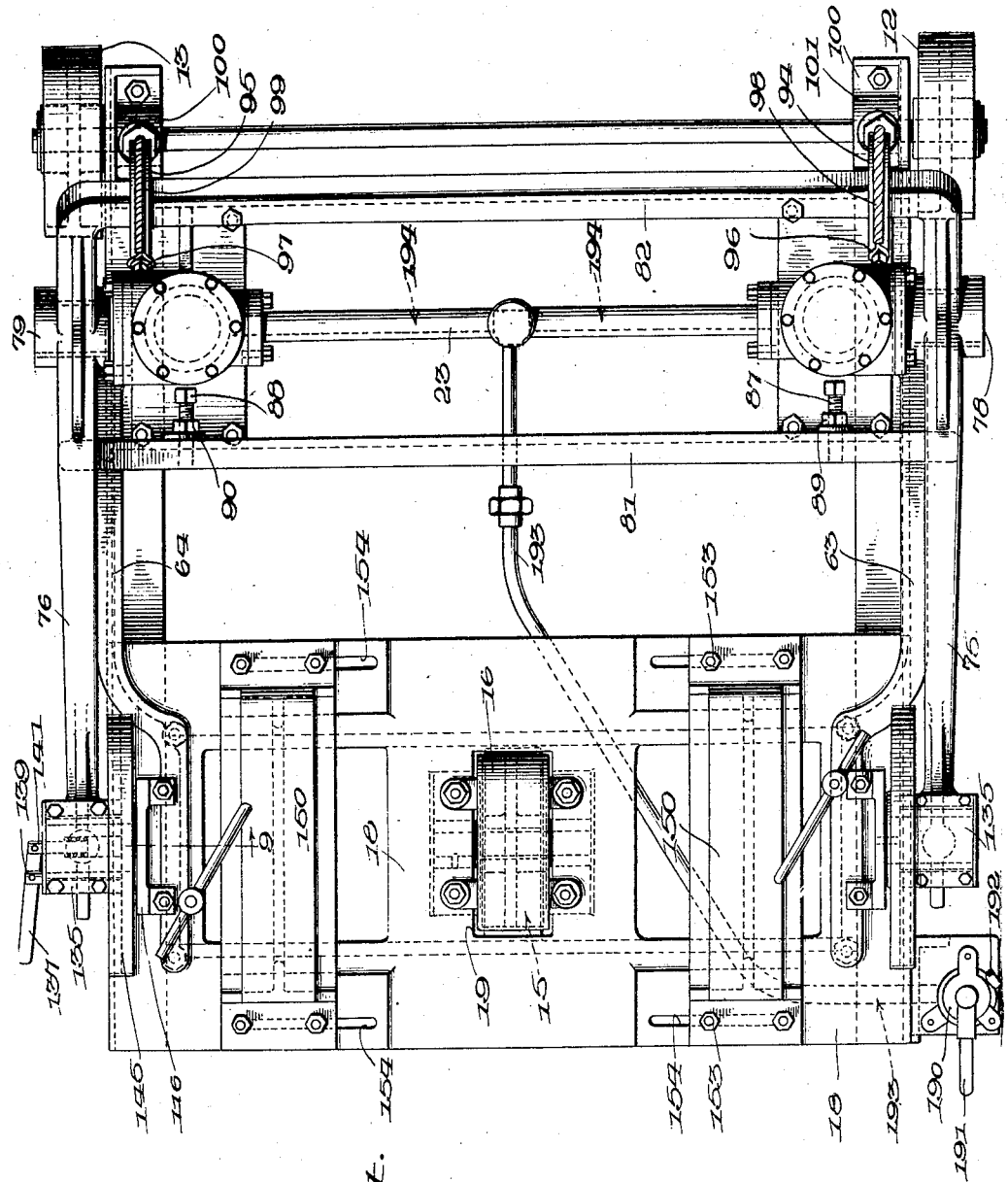

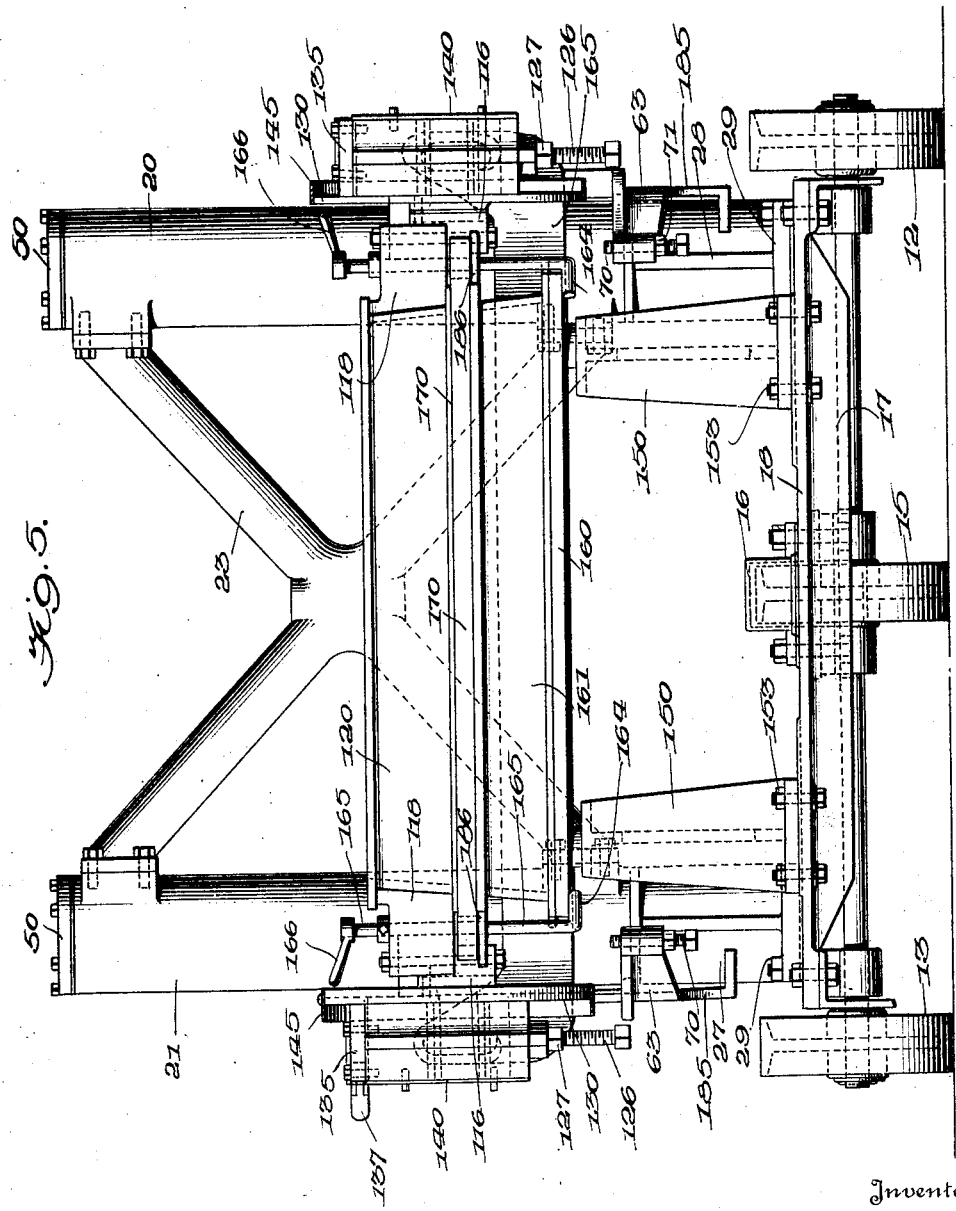

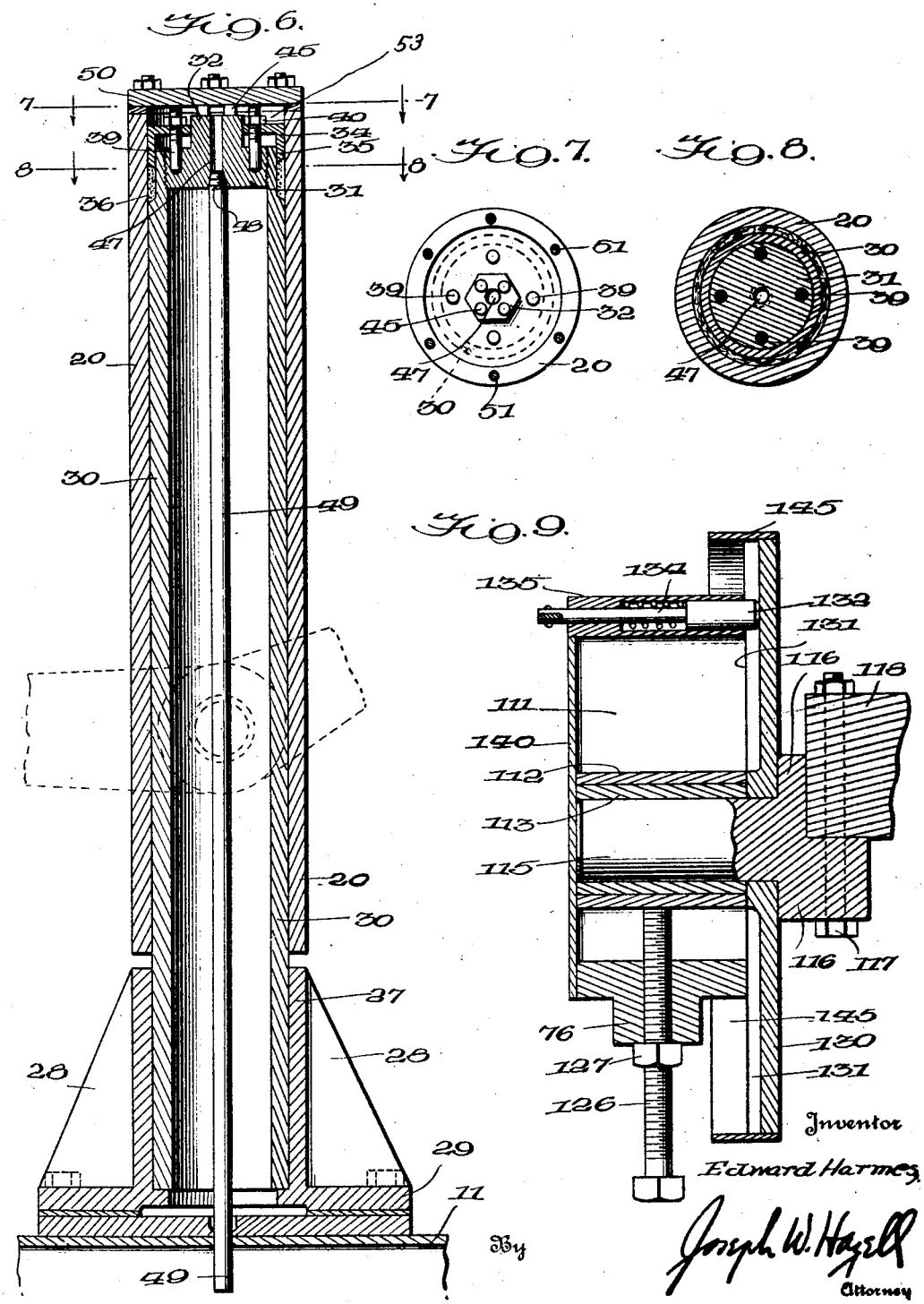

Patented Dec. 18, 1928.

1,695,921

UNITED STATES PATENT OFFICE.

EDWARD HARMES, OF WILKINSBURG, PENNSYLVANIA, ASSIGNOR TO NEW PROCESS MULTI-CASTINGS COMPANY, A CORPORATION OF NEW JERSEY.

MOLDING MACHINE.

Application filed April 9, 1927. Serial No. 182,261.

This invention relates to foundry molding machines, and particularly, though not exclusively, to molding machines provided with facilities and mechanism for producing a complete mold, including the assembled cope and drag molds, ready for pouring.

An object of the invention is to provide a novel and optionally portable power machine of the above type.

Another object is to provide such a machine having an improved pattern drawing, flask stripping and roll-over mechanism, constructed particularly to meet certain practical foundry requirements.

Another object is to provide means for giving the drag an initial lift with respect to the drag mold.

A further object of the invention is to provide such a machine which is simple, sturdy and novel in construction, and which is exceptionally accurate and efficient in operation.

Still further objects and advantages of the invention will appear from the following description, taken in connection with the accompanying drawings forming a part hereof, illustrating, by way of example, a preferred embodiment of the invention, and in which:

Fig. 1 is a side elevation of one form of molding machine embodying the present invention;

Fig. 2 is a similar side elevation, on a reduced scale, showing the parts in a different position;

Fig. 3 is a side elevation of the machine of Fig. 2, showing the parts in another position;

Fig. 4 is a top plan view of the machine of Fig. 1, but with the flask detached;

Fig. 5 is a front end elevation of the machine of Fig. 1, viewed from the left of said figure;

Fig. 6 is an enlarged sectional elevation through one of the flask raising cylinders;

Fig. 7 is a plan view, partly in section, taken on the line 7—7 of Fig. 6;

Fig. 8 is a horizontal sectional view of the cylinder assembly, taken on the line 8—8 of Fig. 6;

Fig. 9 is an enlarged vertical sectional view through the flask engaging end of one of the flask raising arms, and taken on the line 9—9 of Fig. 4.

Referring in detail to the embodiment of the invention illustrated by way of example in the accompanying drawings, the machine is herein shown as including a base frame 11, preferably easily portable and for this purpose provided with rear wheels 12 and 13 and front wheel 15. The front wheel 15, being in this instance located below the flask, is provided with a protecting cover, or sand guard 16, to prevent any sand from reaching the wheel bearings, the sand guard 16 being bolted or otherwise secured to the flat middle portion 18 of the front cross reach 17 of the base frame 11, over its central aperture 19, in which the front wheel 15 is mounted.

The invention provides means for raising and lowering the flask, for drawing the pattern and stripping the mold by moving the parts in a straight vertical line, for rolling over the flask, and for tilting the cope.

As here embodied, this mechanism preferably includes a pair of vertically movable cylinders 20 and 21, connected by a rigid cross brace 23, and movable vertically as a single unit, in the present instance, by power, such as that furnished by compressed air. For this purpose a pair of stationary, preferably hollow pistons are provided, rigidly mounted on the rear of the base frame 11 in any suitable manner, such as that shown in the drawings and particularly in Fig. 6, wherein an annular flange 27 provided with bracing webs 28 has its base 29 bolted or otherwise suitably secured to the base frame 11, and receives within it the vertically extending fixed hollow piston 30.

Referring particularly to Fig. 6, each hollow piston 30 is provided at its upper end with a head 31, preferably threaded into the open upper end of the hollow cylindrical piston wall. The head 31 is shown as being provided with a reduced upwardly projecting central portion 32, projecting through the central opening of a packing plate 34, whose downwardly extending annular flange 35 is adapted to compress the packing 36 between the piston and its cylinder, the piston head 31, for this purpose, being provided with threaded pins 39, projecting through the packing plate 34 and cooperating with adjusting nuts 40 bearing on the upper face of the packing plate for varying the position of the packing plate and thereby varying the compression of the packing 36.

The projection 32 of the piston 30 is provided on its upper end with a plurality of spaced, upwardly extending cylinder abutment stops 45, and an air admission and exhaust passage 47 extends centrally vertically through the piston head 31, the lower end of said passage connecting at 48 with the upper end of an air supply conduit 49, located within the fixed piston 30, and which may be detachably connected at its other end to any convenient or suitable source of compressed air, the flow of air into the conduit 49 being governed by any desirable type of air control valve, which controls the raising and lowering of both cylinders.

The cylinder 20 is provided with the end closing abutment plate 50, secured to the upper end of the cylinder wall in air-tight connection therewith by bolts 51 or other suitable means. In the lowered position of the cylinder, the plate 50 rests upon the spaced abutment stops 45, this construction providing at all times a free and unobstructed passage for air from the conduit 49 into the expansion chamber 53 within the cylinder. In operation, the cylinders are adapted to move upwardly or downwardly, as a unit, upon their respective pistons, according to whether air is admitted into or exhausted from the cylinder expansion chamber; and, by reason of the air-tight construction, the cylinder may not only thus be raised and lowered, but may be stopped or held stationary at any stage of its upward or downward movement.

The invention provides means associated with the vertically movable cylinders 20 and 21 for raising and lowering, rolling over and tilting the flask, and for drawing the pattern and stripping the mold.

Accordingly in connection with the cylinders 20 and 21, there are provided a pair of pattern plate supporting arms 63 and 64, extending forwardly substantially horizontally and approximately parallel, respectively from the cylinders 20 and 21, to which they are rigidly fastened by bolts 65 or any other suitable means. At their free ends the arms 63 and 64 are provided with spaced, adjustable pattern plate engaging abutments, herein shown in the form of threaded bolts 70 extending upwardly through said arms and provided with lock nuts 71 for rigidly clamping the abutments in adjusted position. These abutments are adapted at certain times to lift and support the pattern plate.

Also, in connection with the cylinders 20 and 21, the invention provides a pair of substantially parallel flask supporting arms 75 and 76, which extend forwardly and normally horizontally, above the arms 63 and 64, cooperating at their outer ends to support rotatably a flask, as hereinafter referred to, and which, intermediate their ends, are respectively pivotally secured as at 78 and 79 to the cylinders 20 and 21. The flask arms 75 and 76 are provided, in front and rear of the cylinders 20 and 21, respectively, with front cross reach 81 and a rear cross reach 82, by means of which the flask arms are connected to move as a rigid unit as hereinafter described.

The invention provides means for variably regulating the normal position or position of rest of the flask arms 75 and 76 with respect to the raising and lowering cylinders 20 and 21, and as here embodied, the front cross reach 81 of said arms is, for this purpose, provided with a pair of variably positionable abutment stops, herein shown as being in the form of stop bolts 87 and 88, threaded into the front cross reach 81, and extending rearwardly therefrom toward the respective cylinders 20 and 21, against which, or against a flat hardened steel abutment plate on each cylinder, the stop bolts are adapted to abut, to prevent further downward movement of the flask arms angularly about their pivots 78 and 79 on the cylinders. Suitable means, such as the lock nuts 89 and 90 on the stop bolts 87 and 88, are provided to secure said bolts rigidly in adjusted position.

The invention provides means cooperating with the flask arms 75 and 76, for directing and controlling their movement, to provide for straight line vertical movement of the flask parts for drawing the pattern plate, and for assembling the mold parts and stripping the flask, and during these operations the flask arm control means provides for slow and smooth movement of the parts in a vertical direction. Also, when the flask parts and pattern plate are separated, with sufficient clearance between them to permit the pattern plate to be removed from between the cope and drag, the flask arm controlling means causes one of the flask parts to move in a direction to separate it still further from its cooperating flask part, but with increased speed, and at the same time to tilt it, by changing its linear movement vertically to angular movement about the pivots 78 and 79, and by thus partially rotating it, permitting ready inspection of its interior and at the same time providing increased clearance and head room to permit the molder to set any cores which may be necessary.

To accomplish the foregoing purposes and functions, in the present embodiment of the invention, the means shown includes a pair of segments 94 and 95, spaced apart and rigidly secured to or forming a part of the rear cross reach 82 of the flask arms 75 and 76, and extending toward the rear of the machine. These segments 94 and 95 are provided, respectively, at their upper ends, with any suitable form of cable clamps or cable securing means 96 and 97, to which the upper ends of cables 98 and 99 are respectively secured. The curved outer cable contacting faces of the segments 94 and 95 may be suitably grooved to receive and guide the cables 98 and 99. The cables extend downwardly from the segments, and cooperating with each is a fixed cable guiding and controlling frame 100, rigidly secured upon the base frame 11, extending upwardly therefrom and having an opening in its top 101, through which its associated cable extends freely. The lower end of each cable has secured thereto an adjustable abutment stop 103, adapted to contact with the under side of the top 101 of the cable controlling frame 100 for the purpose of preventing further upward movement of the cable, and consequently of the rearwardly extending ends of the flask arms, and thereby changing the vertical linear movement of the flask arms 75 and 76 to angular movement about the pivots 78 and 79 as the cylinders 20 and 21 continue to move upwardly on their pistons.

The invention provides means for rotatably supporting a flask in the forward ends of the flask arms 75 and 76, and for locking the flask in either upright or inverted position, together with means for clamping together the flask parts and for releasing them.

As here embodied (Figs. 5 and 9), the outer end of each flask arm is provided with a vertical guideway 111, which receives and guides the vertically movable guide block 112, within which is located the cylindrical bearing member 113, which receives and rotatably supports the stub shaft 115 of a flask supporting bracket 116. To the supporting bracket 116 is detachably fixed by through bolts 117, or otherwise, the securing bracket 118 of a cope 120. Each securing bracket 118 is rigidly, though preferably detachably fixed with respect to the cope 120.

Each trunnion or stub shaft 115 of the cope bracket 118 is thus rotatably supported in its guide block 112, and each guide block is vertically movable in its guideway 111.

The guide blocks 112 are preferably supported by means carried by the flask arms 75 and 76, and variably positionable with respect thereto. As here embodied, the adjustable supporting bolts 126 have threaded engagement with the lower and outer ends of the flask arms, and their upper ends are located in the guideways 111 below the guide blocks 112, which rest upon and are supported by the bolts 126. Lock nuts 127 cooperate with the bolts 126 for rigidly maintaining them in adjusted position.

The invention provides means, associated with the flask supporting mechanism, for maintaining the flask in either upright or inverted position, and at the same time, if desired, permitting the flask to move vertically with respect to the flask arms 75 and 76. As here embodied, for this purpose, a guide disk 130 is fixed to the stub shaft 115, and is provided on its outer face with a groove 131 extending diametrically thereacross, within which is slidably received the inner end 132 of a spring pressed detent 134, carried, in the form shown, by the cover plate 135 secured upon the flask arm over the guideway 111. An actuating lever 137 may be provided, if desired, for the detent 134, and is herein shown as being pivotally mounted at 139 on the guideway closure plate 140, and having pivotal or pin and slot connection 141 at one of its ends with the outer end of the spring pressed detent.

An annular sand shedding guard 145 is preferably secured upon the disk 130, to direct sand away from the detent, guideway and flask trunnion bearing.

It will be evident from the foregoing that the flask is movable vertically with respect to the flask arms, and during any such movement it will be held against rotation by the detent 134, which, when released by lever 137, permits the flask to be rolled over, and maintains the flask against rotation in its inverted position by entering the remaining portion of the groove 131.

Cooperating with the foregoing mechanism, the invention provides means carried by the base frame 11 for supporting the assembled flask parts, pattern plate, and at times the finished mold, in stationary position.

As here embodied, a pair of spaced frame supports 150 are detachably mounted on the forward cross reach 17 of the base frame 11, and by means of bolts 153 passing through slots 154 in the cross reach, said frame supports may be slidably adjusted toward and away from each other.

The frame supports 150 are preferably, though not necessarily, rectangular in shape, and are positioned below the flask to support the bottom board 160 of the drag 161, to which the bottom board is detachably connected by means of the clamping hooks 164 formed on the lower ends of the vertical clamping rods 165 rotatably mounted in the cope securing brackets 118, and provided at their upper ends with actuating handles 166, by means of which they may be rotated to clamp together the assembled flask parts with the pattern plate 170 therebetween, or to release said parts for drawing the pattern and stripping the mold.

For operating the lifting cylinders a valve 190 is provided having an intake 192 for compressed air, and an outlet pipe 193 controlled by handle 191 and leading to branch pipes 194 leading in turn to the lifting cylinders.

In operation, the cope 120 is inverted by operating the control valve to raise the lifting cylinders 20 and 21, releasing the detent 134 and rotating the cope on its trunnions or stub shafts 115 through 180°, in which position it will be locked against rotation by engagement of said detent with the locking groove 131 of the plate 130. The cylinders 20 and 21 are then lowered to deposit the cope on the supports 150, and the pattern plate 170 is placed on the cope and positioned accurately thereon by means of the usual pins, after which the inverted drag 161 is positioned on the pattern plate.

Molding sand is introduced into the open drag, and packed therein in any suitable or desired manner, for example, hand ramming, the surplus sand struck off and the bottom board 160 placed thereon and clamped by the retaining or clamping hooks 164. The detent 134 is now released from engagement with the groove 131 of plate 130, and the flask assembly is lifted as before and rolled over on trunnions 115 to upright position, in which the parts are again locked by engagement of the spring pressed detent 134 with its cooperating locking groove 131. The parts are again lowered to deposit the assembly on supports 150, and the cope 120 is now filled with sand and hand rammed.

The pattern is drawn by releasing the retaining hooks 164 and operating the control valve to raise the lifting cylinders 20 and 21. As the cylinders, flask arms 75 and 76 and pattern plate arms 63 and 64 begin to move upwardly, the detached bottom board, drag and pattern plate remain resting on the supports 150, and the cope is drawn upwardly, in a straight line vertically, off the pattern plate until it clears the cope patterns. Continued upward movement of the lifting cylinders brings the pattern plate lifting and supporting pins 70 into engagement with the under side of the pattern plate ends, as shown in Fig. 2, and further upward movement of the cylinders causes the pattern plate to be lifted in a straight vertically upward direction until the drag patterns are clear of the drag. The pattern plate 170 may now be removed in a horizontal direction from its lifting pins or supports 70.

Further upward movement of the cylinders will cause the adjustable abutment stops 103 of the cables 98 and 99 to contact with the under side of the top portions 101 of the fixed stop frames 100, which they have been approaching by reason of the foregoing lifting movement. Further upward movement of the lifting cylinders will not only increase the rate of speed at which the cope is traveling upwardly, but will also change its straight line vertically upward movement into motion in a curved path about the upwardly moving pivots 78 and 79, since the cables 98 and 99 prevent further movement of the rear ends of the flask lifting arms. This brings the parts to the position of Fig. 3 and increases the clearance of the cope with respect to the drag, increases the head room for the molder to place any necessary cores, and tilts the cope upwardly to permit easy inspection of its interior. Segments 94 and 95 abut against cylinders 20 and 21 to prevent further movement of the flask.

The mold is closed by lowering the cylinders to deposit the cope on the drag, during which movement the cope retraces its path of movement; the usual sand retaining slides (not shown) are now released, and the cylinders are again actuated to strip the cope mold by lifting the cope straight upwardly as before, and leaving the stripped cope mold resting on the drag mold. The drag flask is given an initial lift by hook lugs 185 and then is removed from the mold, and the complete mold on the bottom board is now removed from the supports 150 and provided with a slip-over jacket for pouring. The cope flask is then inverted as before, and the operations are repeated to produce another mold.

It will be seen from the foregoing that the invention provides a relatively light, easily portable, power operated, roll-over molding machine, which uses a single flask to produce any desired number of complete molds ready for pouring; which draws the pattern and strips the mold in such a manner as to avoid any undesirable contact of the parts which scrape or deface the mold parts; which automatically tilts the cope flask, and provides adequate spacing of the mold parts for inspection and the setting of cores; which is simple in construction and yet provides flask moving means adequate to eliminate chattering or shaking of the mold as it is raised and lowered; and which insures smoothness and efficiency in operation.

What is claimed is:

1. In a molding machine, a two-part flask, flask supporting means, means for moving said flask linearly, means cooperating therewith and called into action thereby for varying the path of travel of said flask, means for drawing a pattern from both flask parts, and means for assembling the two flask parts to close the mold.

2. In a molding machine, flask handling means including piston and cylinder mechanism, cope supporting arms pivotally mounted with respect thereto and vertically movable thereby in a straight line path, a cope flask carried by said arms, pattern drawing arms carried and moved vertically by said flask handling mechanism and adapted to lift a pattern plate after vertical movement of said flask supporting arms, and means associated with said flask handling mechanism for tilting said flask supporting arms after vertical movement thereof.

3. In a molding machine, flask handling means including piston and cylinder mechanism, cope supporting arms pivotally mounted with respect thereto and vertically movable thereby, a cope flask carried by said arms, pattern drawing arms carried and moved vertically by said flask handling mechanism and adapted to lift a pattern plate after vertical movement of said flask supporting arms, and means associated with said flask handling mechanism including a traveling cable provided with adjustable stop means for tilting said cope supporting arms about their pivots after a predetermined amount of vertical travel thereof.

4. In a molding machine, a two-part flask, a pattern plate therebetween, means for lifting one of said flask parts off said pattern plate, means for lifting said pattern plate off the other of said flask parts, and means cooperating therewith for changing the direction of travel of said first named flask part.

5. In a molding machine, a two-part flask, a pattern plate therebetween, means for lifting one of said flask parts off said pattern plate, means for lifting said pattern plate off the other of said flask parts, and means cooperating therewith for changing the direction of travel of said first named flask part and simultaneously varying its speed.

6. In a molding machine, a two-part flask, a pattern plate therebetween, means for lifting one of said flask parts off said pattern plate, means for lifting said pattern plate off the other of said flask parts, and means cooperating therewith for causing said first named flask part to tilt.

7. In a molding machine, a two-part flask, a pattern plate therebetween, means for lifting one of said flask parts off said pattern plate, means for lifting said pattern plate off the other of said flask parts, and means cooperating therewith for causing said first named flask part to tilt near the upper end of its travel.

8. In a molding machine, upper and lower flask parts, means operable on upward movement to separate said flask parts from each other and also from a pattern plate, means called into action by said first named means for varying the velocity of said upper flask part, said first named means operable upon downward movement to close a mold by assembling said flask parts, and on subsequent upward movement to strip said upper flask part off its mold.

9. In a molding machine, upper and lower flask parts, means operable on upward movement to separate said flask parts from each other and also from a pattern plate, means called into action by said first named means for varying the velocity of said upper flask part, said first named means operable upon downward movement to close a mold by assembling said flask parts, and on subsequent upward movement to strip said upper flask part off its mold and impart to said lower flask part an initial stripping movement with respect to its mold.

10. In a molding machine, upper and lower flask parts, means operable on upward movement to separate said flask parts from each other and also from a pattern plate, said means operable upon downward movement to close a mold by assembling said flask parts, and on subsequent upward movement to strip said upper flask part off its mold and impart to said lower flask part an initial stripping movement with respect to its mold.

11. In a molding machine, upper and lower flask parts, means for securing together said upper and lower flask parts, a pattern plate therebetween and a bottom board on one of said flask parts, rotatable supporting means permitting said assembled flask parts to be rolled over, means operable on upward movement to lift said upper flask part vertically, draw the pattern from both flask parts and subsequently tilt said upper flask part, said means operable on downward movement to close the mold.

12. In a molding machine, upper and lower flask parts, means for securing together said upper and lower flask parts, a pattern plate therebetween and a bottom board on one of said flask parts, rotatable supporting means permitting said assembled flask parts to be rolled over, means operable on upward movement to lift said upper flask part vertically, draw the pattern from both flask parts and subsequently tilt said upper flask part, said means operable on downward movement to close the mold and on subsequent upward movement to release both flask parts from contact with their respective molds.

13. A molding machine having a two-part flask, means operable on upward movement to draw a pattern from both parts of said flask and tilt one of said parts with respect to the other, said means operable on downward movement to assemble the two parts of said flask together to close a mold, and operable upon subsequent upward movement to strip said flask from its mold.

In testimony whereof I affix my signature.

EDWARD HARMES.